Figure 3:
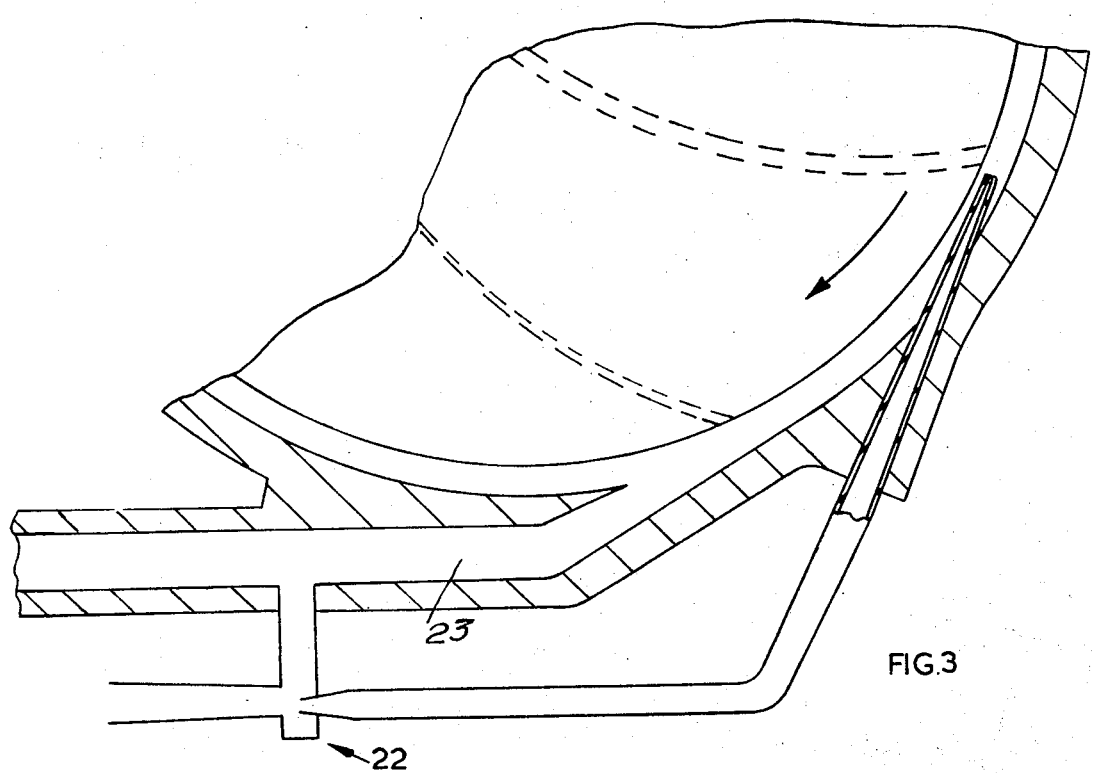

United States Patent [19]
Bottoms

[11] 3,802,796
[45] Apr. 9, 1974

[54] CENTRIFUGAL PUMPS

[76] Inventor: Harry Simister Bottoms, 40 Kineton Green Road, Olton, Solihull, Warwickshire, England

[22] Filed: Oct. 26, 1971

[21] Appl. No.: 192,163

[30] Foreign Application Priority Data
Oct. 27, 1970 Great Britain.................. 50876/70

[52] U.S. Cl.................................. 415/144, 417/68
[51] Int. Cl............................................ F04b 19/08
[58] Field of Search...... 415/144, 148, 147; 417/68, 417/80

[56] References Cited
UNITED STATES PATENTS
1,783,667  12/1930  Mueller.............................. 415/144
2,353,871  7/1944   Bowen............................... 415/147
2,693,914  11/1954  Payne................................ 415/144

FOREIGN PATENTS OR APPLICATIONS
949,907    9/1956  Germany........................... 415/168
679,246    9/1952  Great Britain...................... 417/78
1,001,622  8/1965  Great Britain...................... 417/78
320,523    8/1934  Italy.................................. 415/144

Primary Examiner—Henry F. Raduazo
Attorney, Agent, or Firm—Holman & Stern

[57] ABSTRACT

A centrifugal pump for liquid has an auxiliary outlet which opens into the pump housing adjacent the rotor periphery, and in a direction transverse to a tangent to the periphery, whereby the rotational velocity of liquid within a clearance channel surrounding the rotor is recovered as pressure within the auxiliary outlet. The pump may be scavenged of liquid when its inlet is shut down.

2 Claims, 3 Drawing Figures

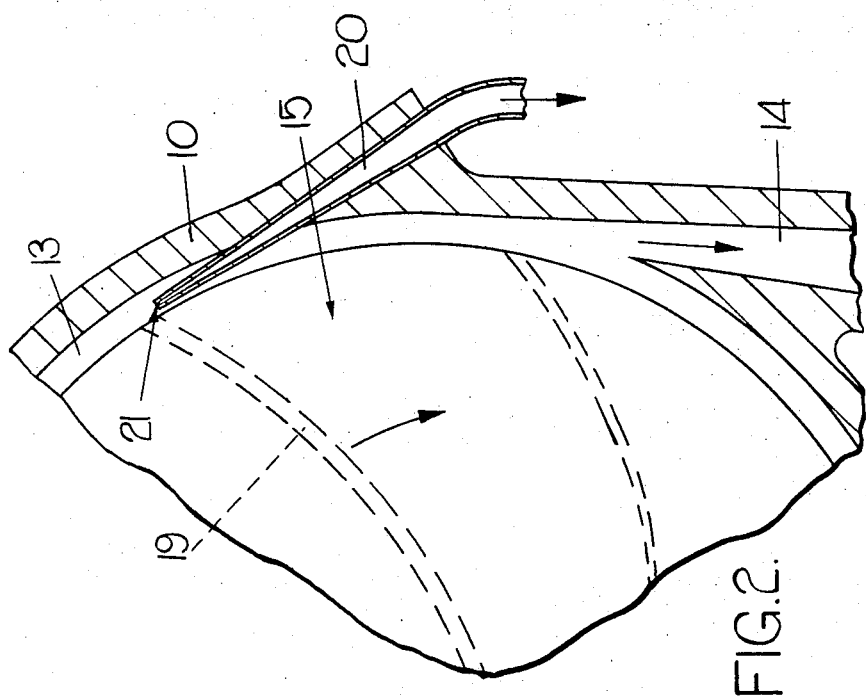
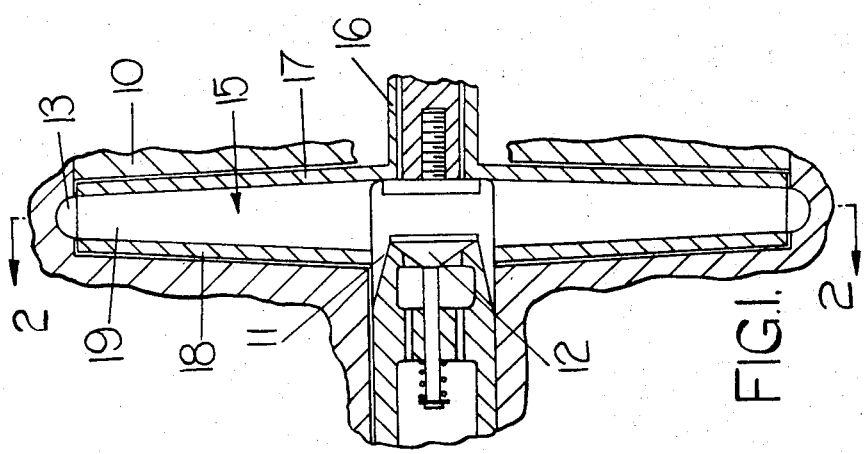

CENTRIFUGAL PUMPS

This invention relates to centrifugal pumps of the type in which the pump inlet includes a control valve for throttling liquid flow through the pump.

In such pumps the outlet of the pump is usually designed as to deliver liquid at a pressure corresponding to the static pressure within the casing and the kinetic pressure arising from the tangential velocity of the liquid is not fully employed. As a result, when the pump inlet is closed the delivery pressure falls rapidly to a low value and, if the pump is to be totally emptied when out of use, some low pressure sink has to be found. Emptying of the pump is of considerable importance in fuel systems for the gas turbine engines of high speed aircraft, where the amount of unnecessary energy dissipated into the fuel must be kept as low as possible. If fuel is trapped in the centrifugal pump of the reheat fuel system, work will continuously be done on such fuel. Unfortunately, in aircraft applications of this type, a low pressure sink cannot usually be found.

It is accordingly an object of the invention to provide a pump of the kind referred to in which emptying of the pump is facilitated.

A centrifugal pump in accordance with the invention comprises a housing, an annular pump chamber in the housing, a valve controlled inlet opening into the inner part of the pump chamber, a main outlet opening into the outer part of the pump chamber, a rotor rotatably mounted in the housing and an auxiliary outlet in a clearance space existing between the periphery of the rotor and the outer surface of the pump chamber, said auxiliary outlet opening into the housing in a direction transverse to a tangent to the rotor whereby the kinetic head of liquid rotating in the pump chamber is recovered in said auxiliary outlet as static pressure.

An example of the invention is illustrated in the accompanying drawings in which FIG. 1 is a cross-section through the pump, FIG. 2 is an enlarged fragmentary section on line 2-2 in FIG. 1 and FIG. 3 is a section, corresponding to FIG. 2, of an alternative embodiment of the invention.

The pump shown includes a housing 10 defining an annular pump chamber which has an inlet 11 controlled by a valve 12 at its centre and a clearance channel 13 communicating with an outlet diffuser 14 at its periphery. Outlet diffuser 14 opens into the inside of the housing 10 generally tangentially of the rotor 15. Rotatably mounted in the chamber is a rotor 15 on a shaft 16. The rotor 15 has a pair of side plates 17, 18 and blades 19 between these. The valve 12 discharges liquid into the rotor through a central hole in the plate 18. The tangential opening of diffuser 14 into housing 10 has the effect that very little of the rotational velocity of the liquid is recovered within diffuser 14, the source of pressure within diffuser 14 being mainly due to the static pressure provided by centrifugal force.

There is also an auxiliary outlet 20 which comprises a tapered tube projecting into the channel 13 in the direction opposite the direction of movement of the adjacent part of the rotor during rotation thereof, and this tube has an open end 21 which is transverse to a tangent to the periphery of the rotor. Thus, in use, the end 21 enables outlet 20 to recover the kinetic head of liquid rotating in the channel 13, and to convert this head into static pressure. The arrangement thereby enables liquid to be emptied from the pump on closing of the valve 12 and more readily than is possible through the main outlet 14.

If desired the auxiliary outlet may be connected as shown in FIG. 3 to a simple ejector device, powered by auxiliary outlet pressure, for scavenging the main outlet 23, whereby fluid within the main outlet 23 is also discharged from the auxiliary outlet.

I claim:

1. A centrifugal pump comprising a housing, an annular pump chamber in the housing, a valve controlled inlet opening into the inner part of the pump chamber, means defining a main outlet opening into the outer part of the pump chamber, a rotor rotatably mounted in the housing and an auxiliary outlet in a clearance space existing between the periphery of the rotor and the outer surface of the pump chamber, said auxiliary outlet being provided by a tapered tube projecting into said clearance space in a direction opposite to the direction of rotation, in use, of the adjacent portion of the rotor, said tube having within said housing an opening which extends in a direction transverse to a tangent to the rotor whereby the kinetic head of liquid rotating in the pump chamber is recovered in said auxiliary outlet as static pressure.

2. A centrifugal pump comprising a housing, an annular pump chamber in the housing, a valve controlled inlet opening into the inner part of the pump chamber, a main outlet opening into the outer part of the pump chamber, a rotor rotatably mounted in the housing, means defining an auxiliary outlet in a clearance space existing between the periphery of the rotor and the outer surface of the pump chamber, said auxiliary outlet opening having means projecting into the housing in a direction opposite to the direction of rotation of the rotor whereby the kinetic head of liquid rotating in the pump chamber is recovered in said auxiliary outlet as static pressure and an ejector device powered by fluid pressure in the auxiliary outlet, whereby fluid in the main outlet may be discharged through the auxiliary outlet.

* * * * *